United States Patent [19]
Dilley

[11] Patent Number: 5,660,404
[45] Date of Patent: Aug. 26, 1997

[54] MOBILE DISPLAY BASE ASSEMBLY

[75] Inventor: Larry D. Dilley, Marion, Ind.

[73] Assignee: Bell Packaging Corporation, Marion, Ind.

[21] Appl. No.: 322,780

[22] Filed: Oct. 13, 1994

[51] Int. Cl.$^6$ .................................................. B62B 1/04
[52] U.S. Cl. .................. 280/47.32; 211/149; 211/133.1; 280/47.18; 280/47.19; 280/79.2; 280/47.3
[58] Field of Search ........................ 280/8, 47.18, 47.19, 280/47.26, 47.3, 47.32, 47.33, 79.11, 79.2; 211/126, 133, 149; 301/64.6, 1

[56] References Cited

U.S. PATENT DOCUMENTS

| | | | |
|---|---|---|---|
| 2,661,959 | 12/1953 | Bell | 280/47.33 X |
| 2,744,710 | 5/1956 | Gerosa . | |
| 2,921,694 | 1/1960 | Decker et al. | 280/47.19 X |
| 3,087,740 | 4/1963 | Mitty et al. | 280/47.33 X |
| 3,427,040 | 2/1969 | Jenkins | 280/47.26 X |
| 3,492,016 | 1/1970 | O'Connor et al. | 280/47.26 |
| 3,918,576 | 11/1975 | Taub | 211/149 X |
| 4,357,029 | 11/1982 | Marini et al. . | |
| 4,836,393 | 6/1989 | Maye . | |
| 4,979,446 | 12/1990 | Winebarger . | |
| 5,176,090 | 1/1993 | Roberts et al. . | |
| 5,443,168 | 8/1995 | Dyment et al. | 280/47.19 X |

FOREIGN PATENT DOCUMENTS 164402 12/1933 Switzerland .

*Primary Examiner*—Brian L. Johnson
*Assistant Examiner*—Avraham Lerner
*Attorney, Agent, or Firm*—Woodard, Emhardt, Naughton, Moriarty & McNett

[57] ABSTRACT

A display assembly includes a box of articles to be displayed at a point of purchase. A bottom portion of the box is glued to a tray unit glued to the top deck of a display base. The tray has side and front flaps providing a receptacle for the bottom of a shipping sleeve surrounding the box, with the flaps taped to the shipping sleeve during shipment. Parallel, horizontally-spaced runners support the display base above the floor. A roller mounted between the runners near the rear ends thereof enables tilting the assembly onto the roller to conveniently roll it along the floor from one location to another, when desired. The entire display base, including the deck, runners and roller assembly, is made of fibreboard. The runners, bearing boxes and cross-bracing are made of die cut corrugated fibreboard build-ups. The roller assembly is made of a combination of spiral wound paper tubes, the inner tube being the axle received in die cut sockets in the bearing boxes. Since the corrugated fibreboard build-ups are secured together with glue, and the hub and roller assemblies are assembled by friction fits or glue, the materials are readily recyclable, when desired. Upon removal of the shipping sleeve, the display base tray flaps are folded down and tab-locked down providing a skirt around the front and sides of the base.

6 Claims, 8 Drawing Sheets

MOBILE DISPLAY BASE ASSEMBLY

BACKGROUND OF THE INVENTION

Field of the Invention

This invention relates generally to merchandise displays, and more particularly to a display base which is normally stable and stationary, but readily movable, when desired, and made entirely of recyclable material.

Display bases for merchandise are made in various ways depending upon the nature of the merchandise to be displayed, the image desired, and cost considerations. For items not requiring a large amount of floor area, it can be desirable to have the display base easily movable in order to facilitate rearrangement of displays in a store, for example. One approach has been to provide a wood structure with plastic casters.

In recent years, due to environmental considerations, there has been an interest in making products recyclable, particularly if the products are of a nature generally considered to be disposable. Also, it is desirable that assemblies of recyclable products be relatively easy and inexpensive to recycle. In the case of pallets, for example, typical wood pallets are made of a combination of wood stringers and deck boards nailed or stapled together. Recycling thereof requires separation of the wood and metal components. Similarly, a display base made of a combination of wood and plastic, would present some problems in recycling. Therefore, it is an object of the present invention to provide a display base which is sturdy and stable in use, but relatively movable when desired, and readily recyclable.

SUMMARY OF THE INVENTION

Described briefly, according to a typical embodiment of the present invention, a display base is made of a combination of floor-contacting runners with decking secured to the top of the runners. A display base tray provides a receptacle for a shipping sleeve and is convertible to a skirt for the display base. The decking, runners and cross-bracing are made of die cut corrugated fibreboard build-ups. A roller unit is made of a combination of spiral wound paper tubes with fibre cores, and an inner tube is received in die cut sockets in build-ups adjacent the runners. The association of the roller with the runners enables the assembly to remain flat and stable on the floor, but rolled along the floor when tipped slightly onto the roller. Since the corrugated fibreboard build-ups are secured together with glue, and the hub and roller assemblies are assembled by friction fits or glue, the materials are readily recyclable, when desired.

DESCRIPTION OF THE PREFERRED EMBODIMENT

Figure 1:
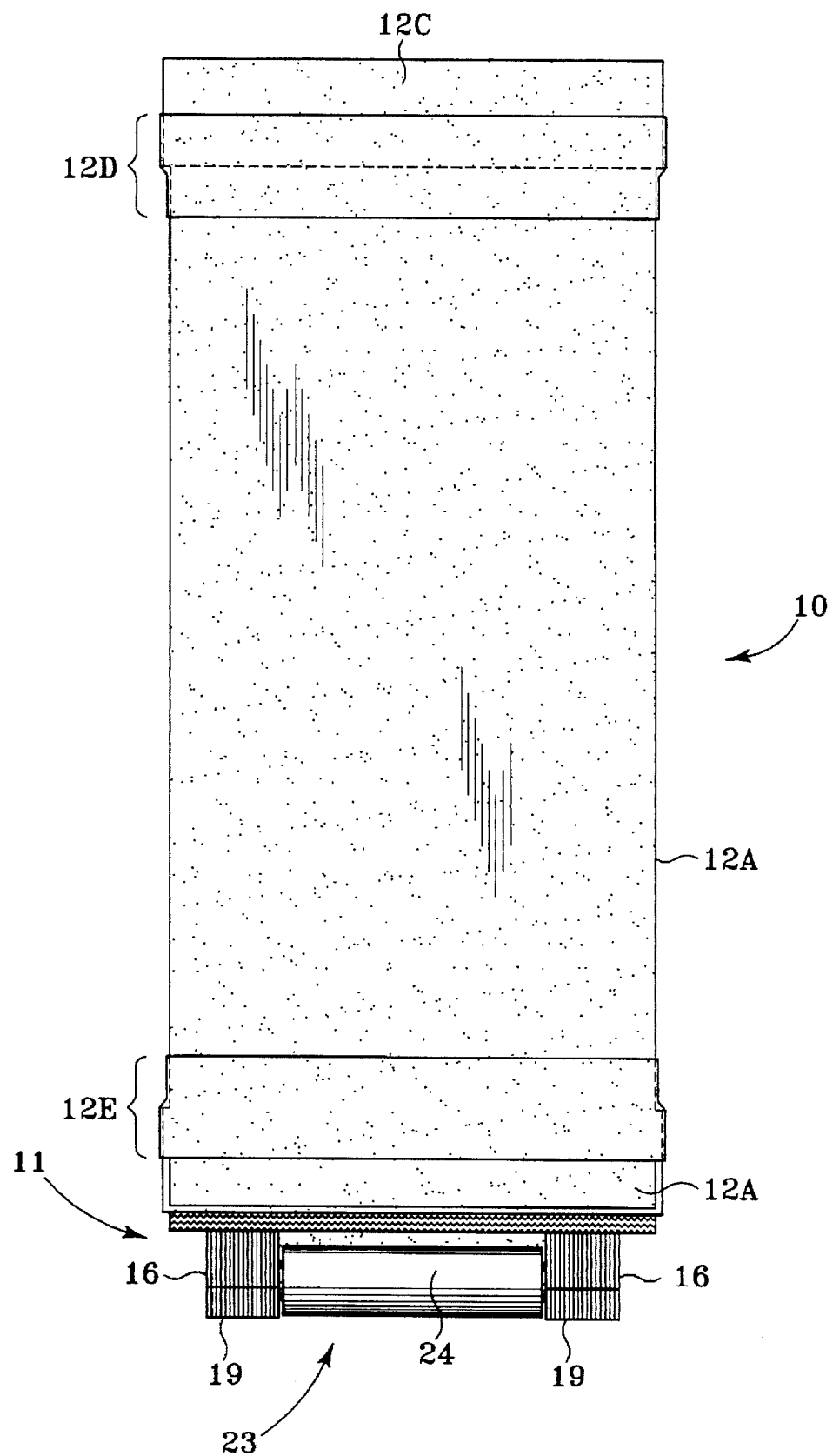
FIG. 1 is a rear elevational view of a merchandising display assembly according to the present invention and as received from the manufacturer at a retail merchandising site, for example.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
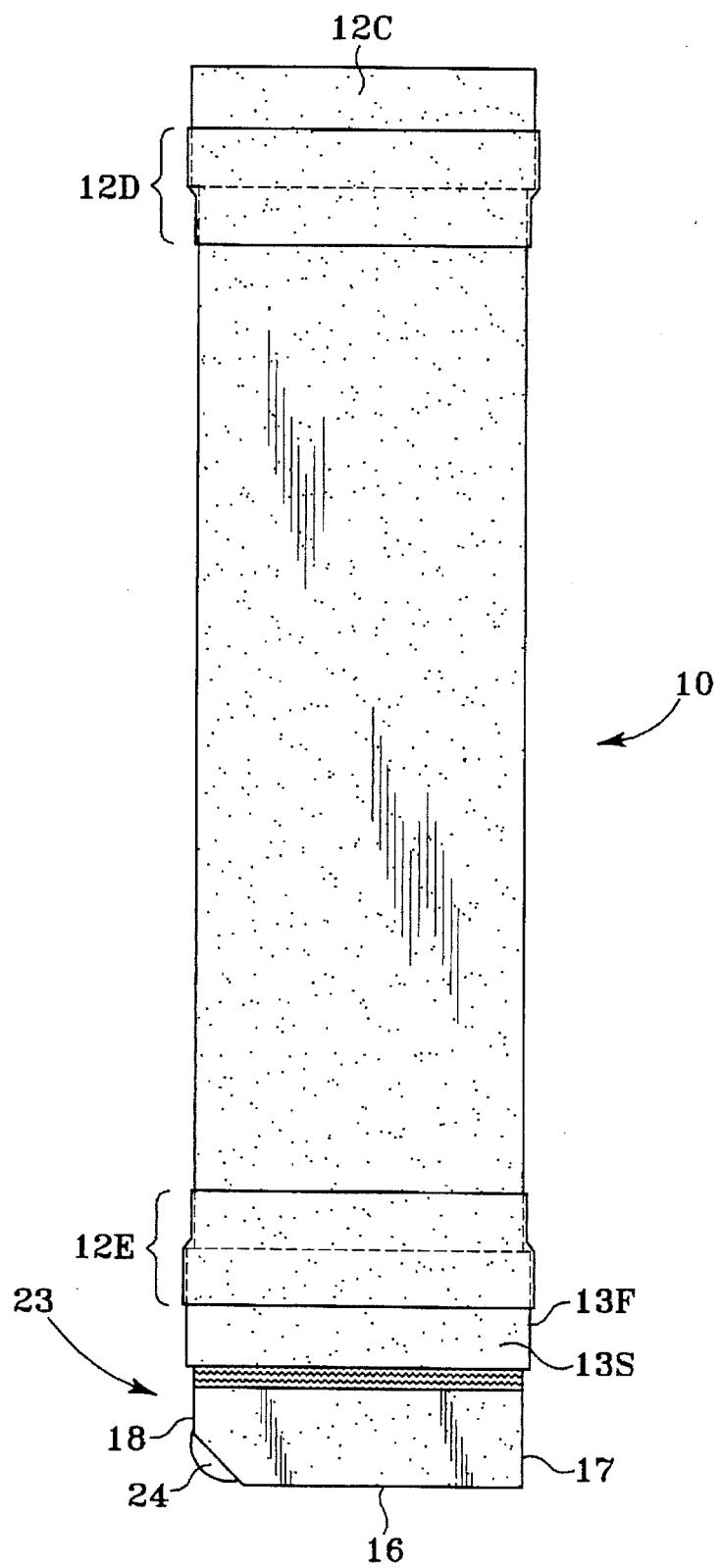
FIG. 2 is a side elevational view thereof.
Figure 3:
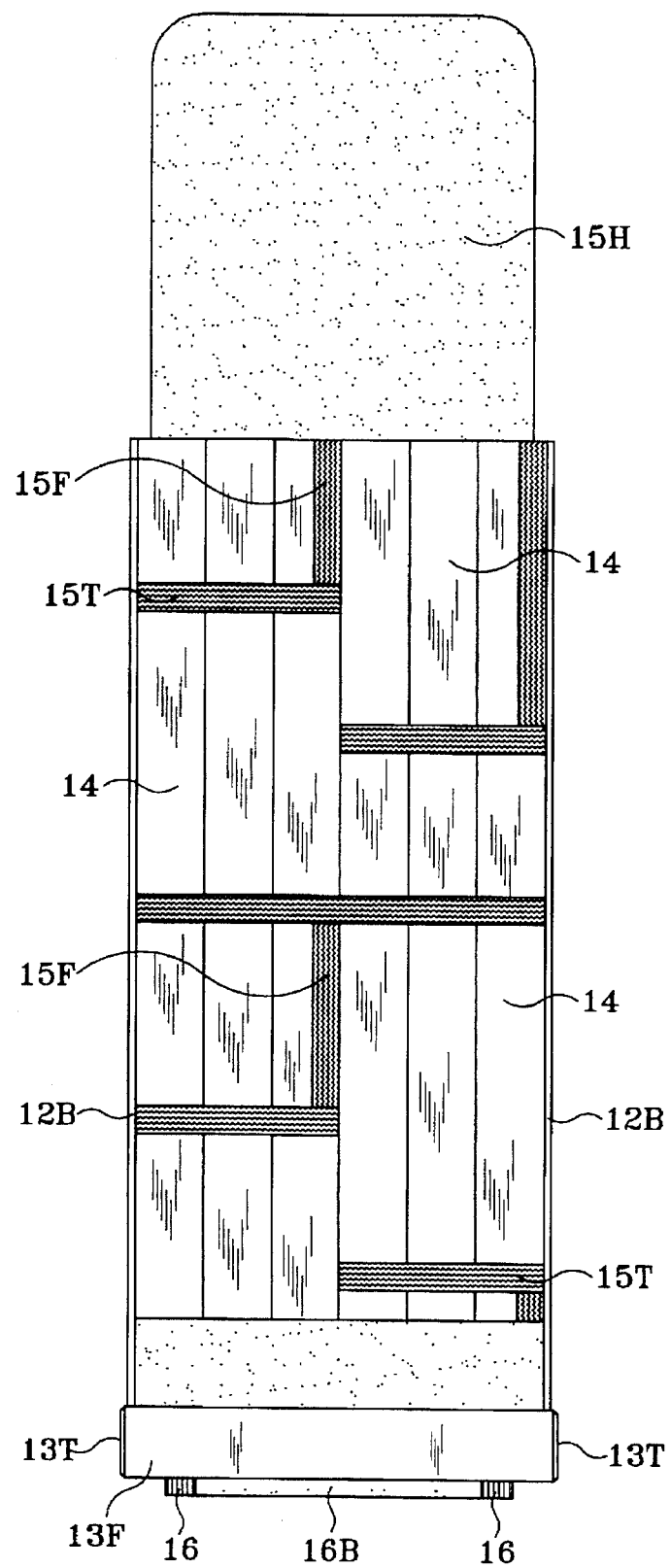
FIG. 3 is a front elevational view thereof with the case opened for display of the merchandise.
Figure 4:
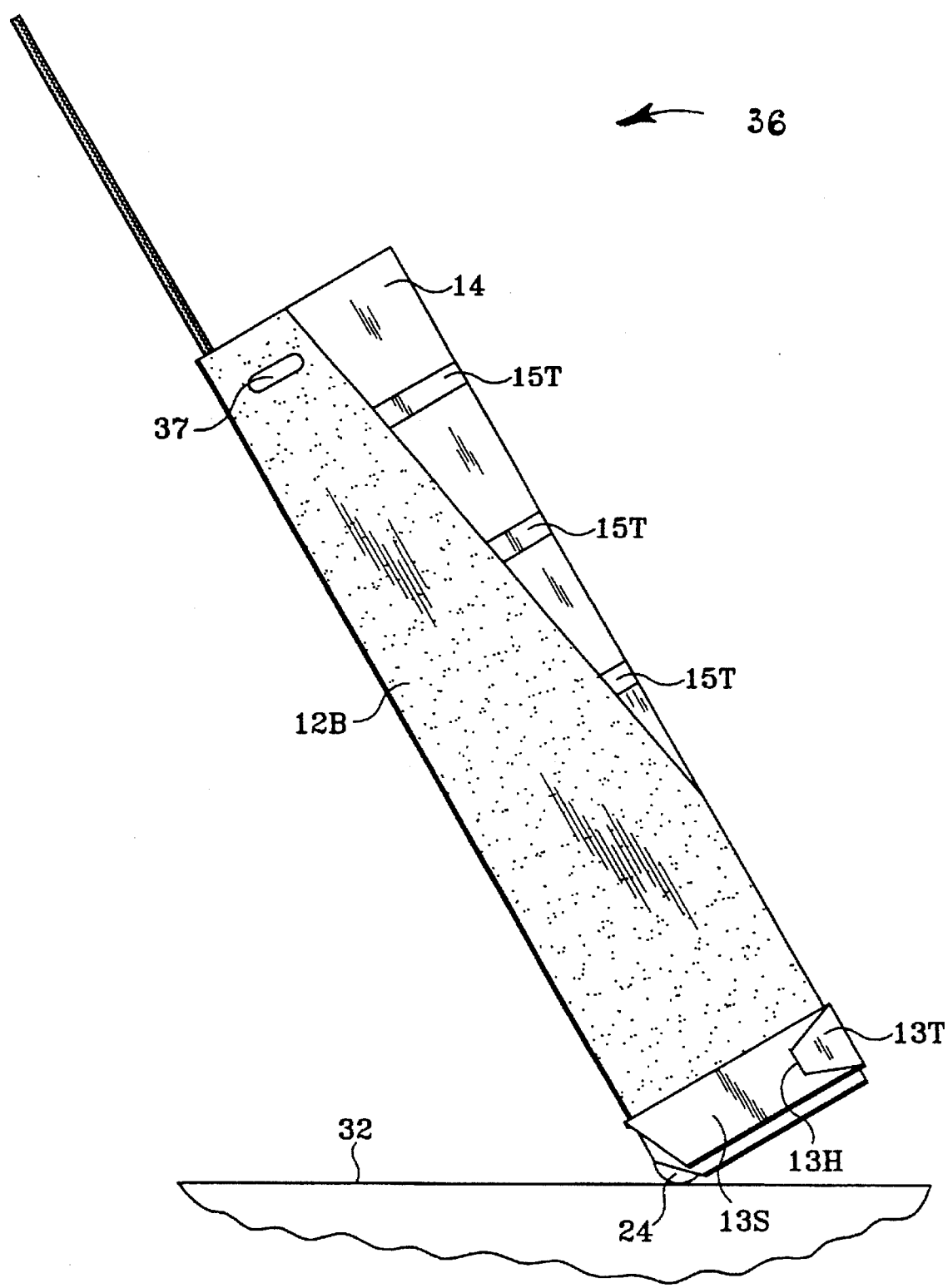
FIG. 4 is a side elevational view thereof when tipped for movement.
Figure 5:
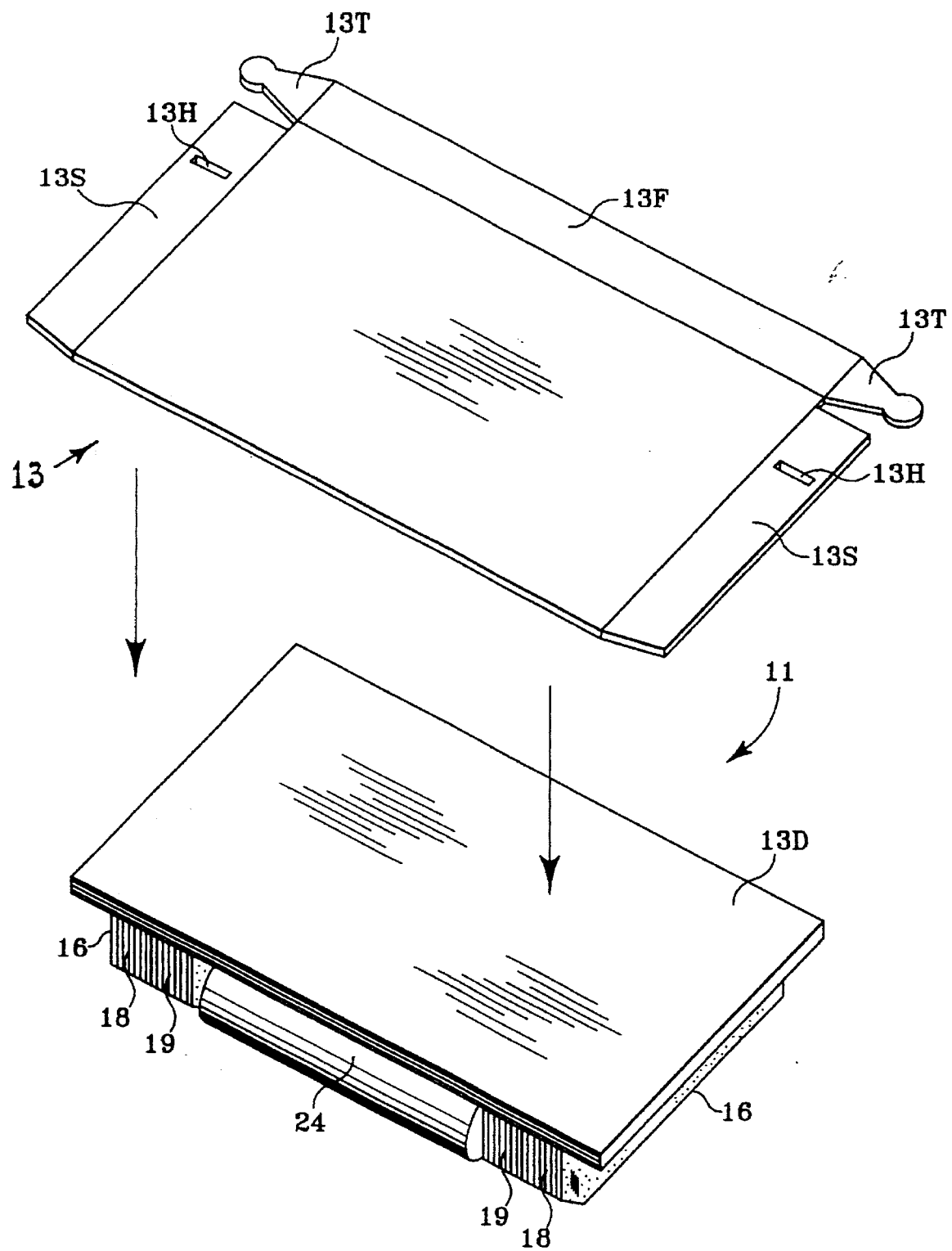
FIG. 5 is an exploded pictorial view of the display base and display base tray portions thereof.

Referring now to the drawings in detail, FIGS. 1 and 2 show front and side elevational views of a display case assembly 10 as received by the retail store, for example, where the contents are to be sold. The case assembly includes the mobile display base 11 according to the present invention, and casing which includes ah outer shroud 12A and inner shroud 12B FIGS. 3 and 4. The outer shroud 12A serves as a four-sided shipping sleeve, the lower wall portions of which are received on a display base tray 13 (FIG. 5) glued to the top of the deck 13D of the display base. The sleeve also has a top cap 12C. The inner shroud 12B includes a back wall and two trapezoidal-shaped side walls. The four walls of the sleeve are taped at 12D to the top cap and at 12E to three upstanding walls or flanges 13F and 13S of the tray 13. Upon removing the tape at 12D, the top cap can be removed. Upon removing tape at 12E the sleeve can be removed by lifting straight up. The flanges 13F and 13S can be folded down on the front and sides and used as a skirt to hide the base assembly as shown in FIG. 3. The front flange has end tabs 13T foldable and secure in side flange slots 13H to hold the flanges down. The tabs could have been used initially to lock the flanges up around the shipping sleeve before taping at 12E, if desired.

The front of the inner shroud 12B is open as shown in FIG. 3, and merchandise in boxes 14 is displayed. Merchandise segregating and support trays 15T are spaced as and where needed in the display, and filler strips 15F are strategically situated to display the various sizes of boxes as desired, all of the merchandise being confined within the two sides and back wall of the inner shroud 12B, but readily accessible to the customer through the front opening of the shroud. A header card 15H is slid down in back of the top layer of merchandise. Cases of this general type are known in the art, but not combined with a display base such as in the present invention.

Further referring to the display base itself, and particularly FIGS. 5–8, two runners 16 are glued to the bottom of the deck 13D. A cross-brace 16B is glued to the bottom of the deck about midway between the front and rear ends 17 and 18 of the runners, and is glued at its ends to the runners. Bearing blocks 19 are glued to the inside faces of the runners at the rear ends of the runners. Each bearing block has a hole 21 die cut through it. These holes receive the ends of a wound paper tube rotatable in the sockets. This tube 22 is the axle of the roller assembly 23, the outer tube 24 thereof being mounted to the axle tube by hub spacers 26 at opposite ends of the outer tube. The ends 27 of the axle abut the inner faces 28 of the runners to control the end-to-end movement of the roller, and avoid contact of the hub spacers or the outer tube ends (such as 29) with the inner faces 28 of the runners at the bearing blocks.

Figure 6:
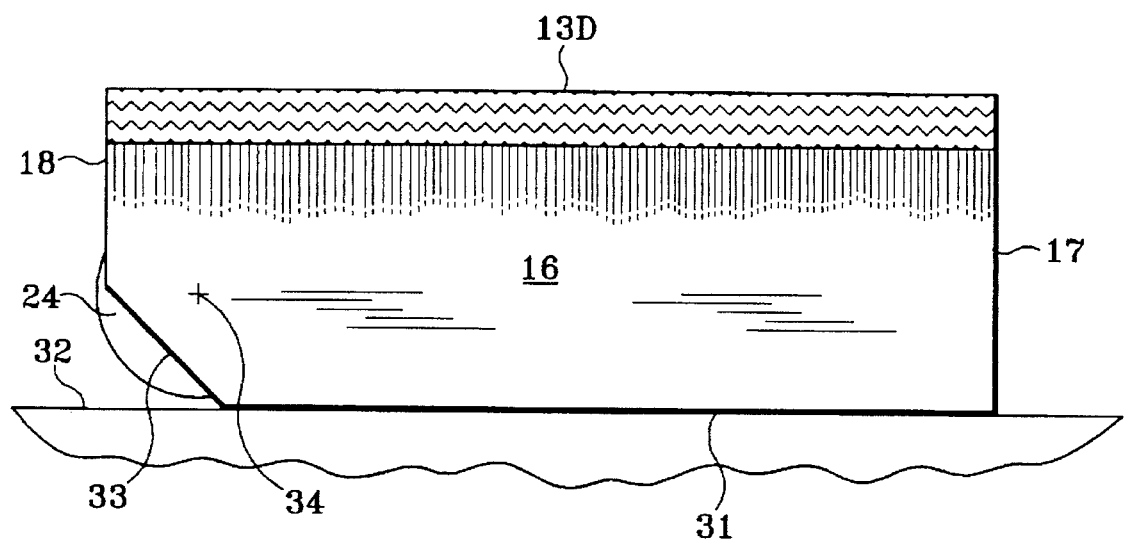
FIG. 6 is an enlarged side elevational view of the display base portion thereof.
Figure 7:
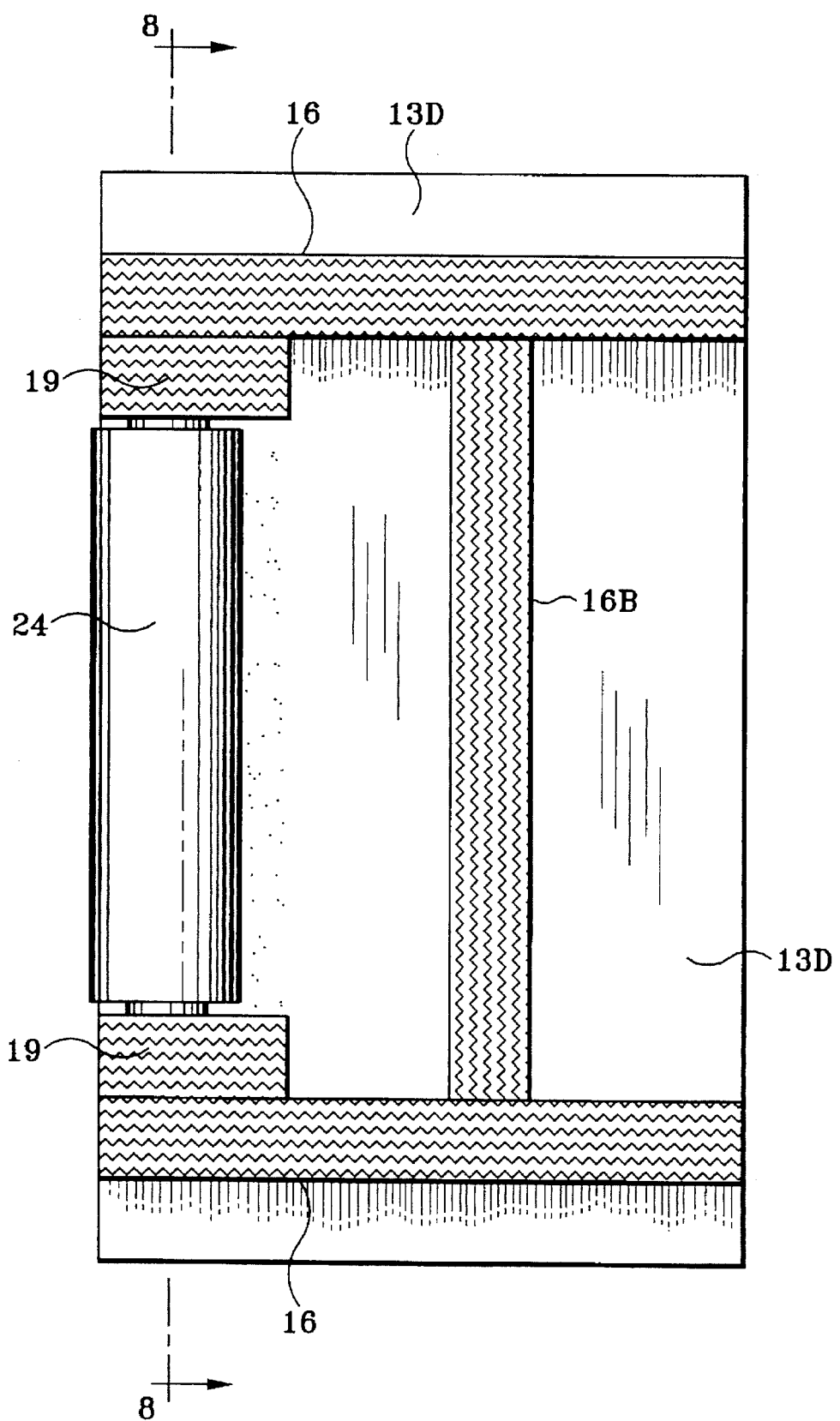
FIG. 7 is a bottom plan view of the display base.
Figure 8:
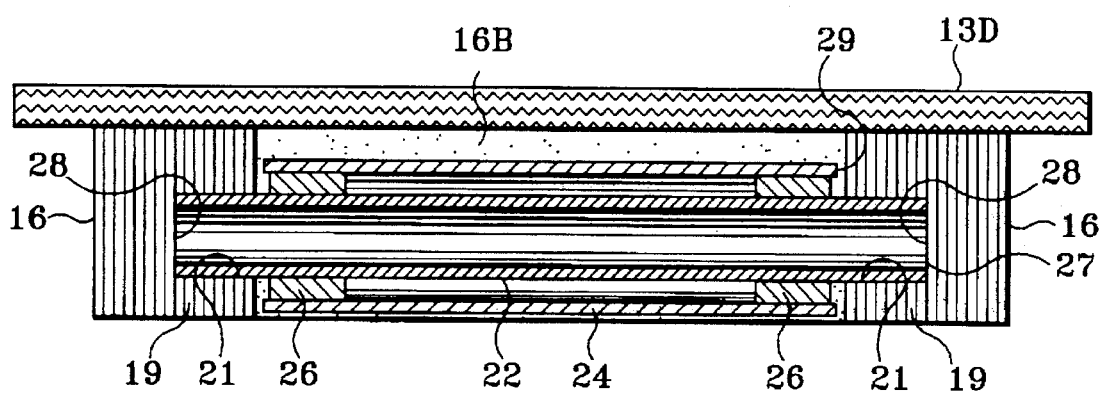
FIG. 8 is a section taken at line 8—8 in FIG. 7 and viewed in the direction of the arrows.

As best shown in FIGS. 6 and 8, the roller axle and bearing sockets are such that the outer cylindrical surface of the outer tube is normally spaced above the plane 31 of the lower edges of the runners so that when the display base is resting on the floor 32, the roller 24 is spaced above the floor, typically 1/16 to 1/8 inch. However, the lower rear end of the runners is chamfered as at 33 at a distance which, with respect to the axis 34 of the roller, is less than the diameter of the roller. Therefore, when the display base is tipped up in the direction of arrow 36 (FIG. 4), the bottoms of the runners no longer touch the floor, and the roller then is supporting the display base on the floor so that it can be rolled to a different location. This can be done conveniently while the merchandise is on the display base by simply standing behind the display, putting one's fingers into the handholes such as 37 which are in each of the sides of the inner shroud 12B, tilting it backward, and pushing or pulling the unit to the next desired location.

After initial filling of the display case assembly with merchandise and upon installation of the shipping sleeve, the lower edges of the sleeve rest atop the display base tray immediately inside the hinge lines of the three flaps 13F and 13S. If desired to facilitate such positioning of the sleeve, these flaps may be folded up and tab locked. In the illustrated example, the bottom of the inner shroud 12B is of essentially the same size as the center panel of the display base tray 13 and deck 13D and is glued to the top of the display base tray 13 and, if desired, may be stapled through that panel to the deck 13D of the display base. Thus the bottom, back and side walls of the inner shroud 12B are secured to the display base at all times. But when the tape at 12E is removed from the flaps and outer shroud 12A, the flaps are folded down at the sides and front and locked in place as discussed above.

The deck 13D, the runners 16, the cross-brace 16B, and the bearing socket blocks 19 are made of die-cut corrugated fibreboard which is built-up to the desired width and thickness depending upon requirements for the weight of the product to be displayed. The number of deck sheets and material thickness may vary, also according to the weight of the product. The overall shape of the top of the deck, while normally rectangular, may also be hexagonal, octagonal, round, or some other configuration to conform to the footprint of the product to be displayed on the display base. Similarly, the runners will vary in length, width, thickness, number of runners required, and material used in them, all depending on the requirements for the weight of the product. The glue used also will be selected in accordance with the needs for the product.

With regard to the roller assembly components, they may vary in length, diameter, and wall thickness, depending upon the requirements for weight of the product. The hub spacers may be glued to the inner and outer tubes, or simply friction fitted thereto. The tubes are spiral wound paper with multiple overlapping layers. The weight of paper, number of layers, thickness, glue, and overlap are determined by the size and load requirements. One example of a mobile display base would have a deck 11 7/8 inches by 19 1/2 inches rectangle, and height from runner base to deck top of 4 1/4 inches.

In the illustrated example, the front and rear ends of the runners 16 are flush with the front and rear ends of the deck. The runner bottoms are flat and co-planar, as is the bottom of the cross brace 16B. If, for some reason, it is considered desirable to have recesses in the bottom faces of the runners, or holes therein, for reception of forks of a fork-lift or similar pallet handling device, that can be done. There would remain sufficient area at the bottom of the runners to serve as feet or pads at the front and the rear so as to have the display remain stable on the floor but tiltable upward for moving on the roller, when desired, just as in the illustrated embodiment.

From the foregoing, it can be understood that the present invention enables the manufacture and use of a device well suited for its original intended purpose of merchandise display, but readily recyclable when its useful life is finished.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mobile display device comprising:

a deck on which an article to be displayed may be mounted;

a roller having an axle connected to the deck and located below the deck for rotation about an axis, the roller being adjacent one margin of the deck;

a base member connected to the deck and located below the deck and normally resting on a floor and supporting the deck above the floor;

the base member being tiltable upward about the roller axis and thereupon rollably supported by the roller for rolling the device along the floor, the deck, base member, axle and roller being composed entirely of glued fibre material.

2. A mobile display device comprising:

a deck on which an article to be displayed may be mounted;

a roller having an axis and connected to the deck and located below the deck and adjacent one margin of the deck;

a base member connected to the deck and located below the deck and normally resting on a floor and supporting the deck above the floor;

the base member being tiltable upward about the roller axis and thereupon rollably supported by the roller for rolling the device along the floor, the deck, base member and roller being composed primarily of fibre material;

the base member being an elongate runner comprising a corrugated fibreboard build-up permanently fixed to the deck;

a second runner connected to the deck and located below the deck and spaced from the first runner, the roller being located in the space between the runners and near the rear ends of the runners;

axle bearing bosses at opposite ends of the roller and inboard of the runners and secured to the runners, the bearing bosses cooperating to provide the bearings for the roller, whereby the device is supported by the roller near the rear ends of the runners as the device is rolled along a floor; and a cross member having a top and having ends, the cross member extending between the runners, and the ends of the cross member being secured to the runners and the top of the cross member being secured to the deck.

3. The device of claim 2 and wherein:

the deck has a planar top;

the runners and cross member have flat lower edges that are coplanar in a plane parallel to the plane of the deck top.

4. A mobile display device comprising:

a deck on which an article to be displayed may be mounted;

a roller having an axis and connected to the deck and located below the deck and adjacent one margin of the deck;

a base member connected to the deck and located below the deck and normally resting on a floor and supporting the deck above the floor;

the base member being tiltable upward about the roller axis and thereupon rollably supported by the roller for rolling the device along the floor, the deck, base member and roller being composed primarily of fibre material;

the base member being an elongate runner comprising a corrugated fibreboard build-up permanently fixed to the deck;

the roller being of multiple layers of wound fibreboard, the roller being mounted on an axle made of wound fibreboard extending through the roller and out the ends of the roller into bearing bosses mounted to the runners, and the bearing bosses being made of corrugated fibreboard build-ups glued to inside faces of the runners.

5. A mobile display device comprising:

a deck on which an article to be displayed may be mounted;

a roller having an axis and connected to the deck and located below the deck and adjacent one margin of the deck;

a base member connected to the deck and located below the deck and normally resting on a floor and supporting the deck above the floor;

the base member being tiltable upward about the roller axis and thereupon rollably supported by the roller for rolling the device along the floor, the deck, base member and roller being composed primarily of fibre material;

the base member being an elongate runner comprising a corrugated fibreboard build-up permanently fixed to the deck;

a second runner connected to the deck and located below the deck and spaced from the first runner, the roller being located in the space between the runners and near the rear ends of the runners; and axle bearing bosses at opposite ends of the roller and inboard of the runners and secured to the runners, the bearing bosses cooperating to provide the bearings for the roller, whereby the device is supported by the roller near the rear ends of the runners as the device is rolled along a floor; and the bearing bosses being corrugated fibreboard build-ups connected to the deck.

6. A mobile display device comprising:

a deck on which an article to be displayed may be mounted;

a roller having an axis and connected to the deck and located below the deck and adjacent one margin of the deck;

a base member connected to the deck and located below the deck and normally resting on a floor and supporting the deck above the floor;

the base member being tiltable upward about the roller axis and thereupon rollably supported by the roller for rolling the device along the floor, the deck, base member and roller being composed primarily of fibre material;

the base member being an elongate runner comprising a corrugated fibreboard build-up permanently fixed to the deck; and the roller having an axle made of fibreboard.

* * * * *